Aug. 26, 1969    F. GRASENICK ET AL    3,462,969
MICROTOME USING LIQUID REFRIGERANT
Filed Sept. 5, 1967

INVENTORS
FRITZ GRASENICK,
WOLFGANG GEYMAYER &
ADOLF ALDRIAN
BY
ATTORNEY 3,462,969
MICROTOME USING LIQUID REFRIGERANT
Fritz Grasenick, Wolfgang Geymayer, and Adolf Aldrian,
all of 17 Steyrergasse, Graz, Austria
Filed Sept. 5, 1967, Ser. No. 665,394
Claims priority, application Austria, Sept. 8, 1966,
A 8,471/66
Int. Cl. B26d 4/50
U.S. Cl. 62—373                          4 Claims

ABSTRACT OF THE DISCLOSURE

An apparatus for preparing refrigerated cut specimens for microscopical examination with a container, in which the specimen is carried by a supporting plate and submerged in a liquid refrigerant. Within the said refrigerant there is also arranged a microtome knife.

Summary of the invention

Figure 1:
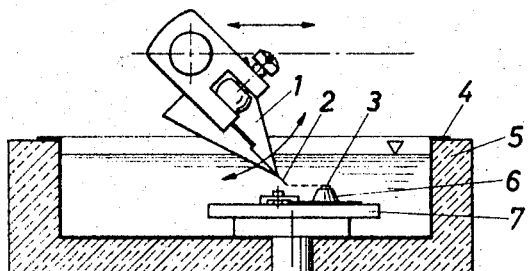

Briefly, a device for preparing refrigerated specimens for examination by an optical or electron microscope, according to the present invention comprises an open-topped, tublike container, which is surrounded by heat-insulating means. The container has a detachably and adjustably mounted mounting and is dimensioned so that the specimen-carrying part of the mounting, the specimen, and a microtome knife acting on said specimen will be completely submerged in a liquid refrigerant if the container is filled with such refrigerant.

Apparatus for preparing refrigerated cut specimens for microscopical examination Refrigeration is often required in the preparation of speciments for examination by optical or electron microscopes. Such refrigeration is particularly necessary if the specimens to be examined are liquid at normal temperatures or contain at least one liquid phase. Such specimens are, e.g., emulsions or suspensions. Refrigeration is also required for an examination of substances having a low softening point. Both conditions are often encountered in the examination of dispersions of plastics materials.

Refrigeration is also required in an examination of substances which are susceptible to heat or in cases where undesired thermally induced changes in the materials must be reliably prevented.

Various types of refrigerating microtomes are available for the preparation of specimens for examination by optical or electron microscopes. In such refrigerating microtomes, refrigeration is effected in that heat is extracted by expanding gases, such as $CO_2$. In this case, the specimen carrier is refrigerated, in most cases from below, the effect of the refrigeration may sometimes be utilized for holding the specimen, and a refrigerated protective envelope is formed around the specimen.

The known refrigerating microtomes are not satisfactory for a number of practical purposes. All types have the important disadvantage that the temperature of water used as a refrigerant is restricted, generally to about $-20°$ to $-30°$ C. and this is not sufficient for many purposes. The cutting operation performed in the microtome results in the local action of very strong forces, which may lead to a substantial temperature rise. In order to avoid artefacts in the structure, it is essential in many cases that specimens to be prepared are permanently refrigerated, also during the cutting operation, and that they are subjected to such refrigeration throughout their thickness at the surface of cut. This applies to the preparation of sections as well as of cuts.

To overcome the above-mentioned difficulties, microtomes have been proposed in which the cutting operation is performed in a vacuum. These microtomes are not satisfactory too. It is known that the conduction of heat in a vacuum is less than under normal pressure so that local hot spots which are the result of the cutting operation may have particularly undesirable effects. Besides, a refrigerated specimen which is accommodated in a high vacuum may constitute a "refrigerated trap" for impurities.

It is an object of the present invention to eliminate the disadvantages which have been described. The invention relates to a device for the preparation of refrigerated sections for examination by an optical or electron microscope and affords a simple, inexpensive and reliable solution to the problems which have been pointed out hereinbefore.

The invention essentially provides a device comprising an open-topped, tublike container, which is surrounded by heat-insulating means and provided with means for the fixation of the container in the specimen-carrying part of a microtome, and a mounting for holding the specimen, which mounting is detachably and adjustably mounted in said tublike container, which is dimensioned so that the specimen-carrying part of the mounting, the specimen and a microtome knife acting on said specimen will be completely submerged in a liquid refrigerant if the container is filled with such refrigerant.

According to another feature of the invention, the device comprises a gripper having two retaining jaws, which are guided by a spring-loaded rod and converge to form a conical head, and a cap, which is accommodated in said jaws and urged by a spring beyond the outer edge of said jaws.

According to a further feature of the invention, the gripper is operable by a push button.

Figure 2:
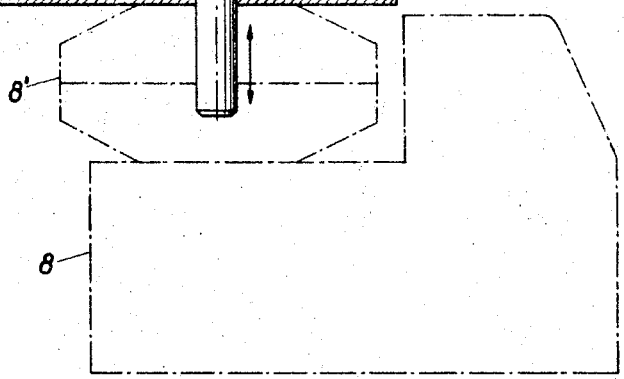
Figure 2:
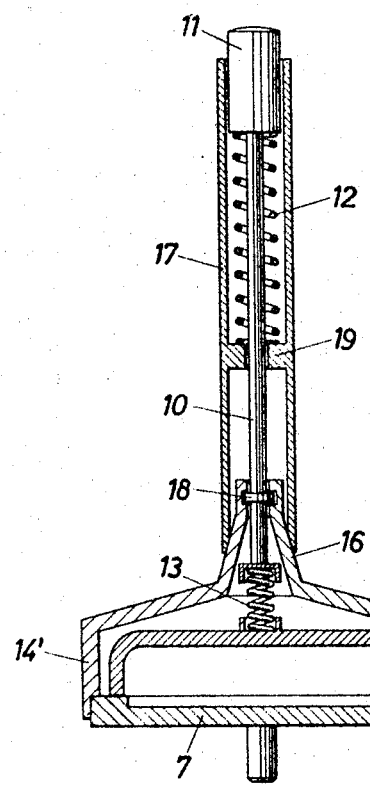

In the drawing:

FIG. 1 shows by way of example an embodiment of the device according to the invention for incorporation in a microtome and FIG. 2 a desirable embodiment of a gripper.

The device is intended for use together with the specimen-carrying part and the knife holder 1 and knife guide of a conventional microtome 8, which is partly indicated in dotted lines in FIG. 1 and may be a refrigerating microtome. The device consists essentially of a tub 4, e.g., of sheet copper, and means for connecting the tub to the specimen-carrying part 8' of the microtome so that the tub is movable and preferably adjustable in height relative to said specimen-carrying part. The tub 4 is open at its top and is surrounded elsewhere by heat-insulating material 5, such as a foamed plastic material. The specimen plate 7 together with the mounting 6 for the specimen 3 to be prepared is detachably and adjustably disposed in the tub 4 in such a manner that the plate 7, the mounting 6 and the specimen 3 are disposed below the top rim of the tub 4.

A gripper shown in FIG. 2 is used for lifting the specimen plate 7 from the tub 4 and for transferring said plate into a vacuum device, not shown. The gripper comprises two retaining jaws 14, 14', which are guided by an actuating rod 10 and form a converging head part 16 in the form of a split frustum of a cone. This head part 16 embraces a collar 18, which is provided on the rod and serves for driving the head part 16. The rod 10 extends through a holding tube 17 and at its end remote from the jaws is provided with a pushbutton 11, which protrudes from the tube 17. A coil spring 12 surrounds the rod 10 and bears at one end on the push button 11 and at the other end on a collar 19 provided on the tube 17 and tends to draw the rod 10 into the tube 17 together with the jaws 14, 14' while closing the latter. The jaws 14, 14' contain a cap 15, which consists of Teflon and is biased by a coil spring 13 normally urging the cap 15 partly beyond the jaws. The coil spring 13 is connected at one end to the cap 15 and at the other end to rod 10. The drawing shows the gripper in position for use engaging the specimen plate 7. This position will be described hereinafter.

The specimen plate 7 disposed in the refrigerating tub has preferably the same design as the specimen plate of the devices covered by Austrian patent specifications No. 239,877 and No. 239,876 and has consequently also the advantages of said known specimen plates particularly as regards the possibility of rotating the plate in all directions during the further treatment of the specimen at low temperatures in the treatment chambers disclosed in said patents.

In operation, the tub 4 is filled with a liquid refrigerant, such as liquid nitrogen, liquid inert gas or an organic liquid, so that the specimen with the supporting plate 7 and the mounting 6 as well as the knife 2 are entirely submerged in the liquid refrigerant throughout the cutting operation. If the specimen plate 7 is to be lifted from the tub 4 and to be inserted, e.g., into a vacuum device, the gripper shown in FIG. 2 is applied to the specimen plate in the manner which is illustrated. For this purpose, pressure is applied to the button 11 to open the jaws 14, 14', which are then moved over the specimen plate 7. When the gripper has been applied to the specimen plate 7, the compression spring 13 first urges the protective cap 15 into engagement so that a chamber which is closed from the exterior is formed over the specimen plate. A slight pressure is overcome to move the retaining jaws 14, 14' to their correct position. When the push button 11 is now released, the frustoconical head 16 will be drawn into the tube 17 so that the retaining jaws 14, 14' hold the specimen plate 7 in position. If this operation is performed in liquid nitrogen, a certain quantity of said liquid nitrogen will be trapped under the protective cap. The evaporating nitrogen keeps the specimen refrigerated and flows outwardly. This prevents also an ingress of the ambient fluid (humid air). To insert the specimen plate into the vacuum equipment, the operation is performed in the reverse order.

The advantage which is afforded by the device according to the invention resides mainly in that an uninterrupted, uniform and defined refrigeration is ensured.

The entire cutting operation can be visually observed because a fogging or icing of the specimen or cutting device is obviously prevented. It is also obvious that the liquid refrigerant covers the specimen and particularly its cut surface to protect it from undesired external influences.

Besides, the liquid refrigerant, such as liquid nitrogen, has a most desirable lubricating effect. Ice particles which would otherwise deposit on the knife and the specimen are simply flushed away. The specimen plate 7 together with the tub 4 and the insulation 5 can be inserted into any desired microtome instead of the usual specimen carrier.

What is claimed is:
1. A device for preparing refrigerated specimens for examination by an optical or electron microscope, comprising in combination:
an open-topped, tublike container, heat-insulating means surrounding said container, and means for fixation of the container in the specimen-carrying part of a microtome having a knife,
a mounting for holding the specimen, means for detachably and adjustably holding said mounting in said tublike container, the specimen-carrying part of the mounting, the specimen, and the microtome knife acting on said specimen being completely submerged in a liquid refrigerant disposed in said container,
and a gripper having two retaining jaws which are guided by a spring-loaded rod and converge to form a conical head, and a cap, which is accommodated in said jaws and urged by a spring beyond the outer edge of said jaws, said gripper being dimensioned to grasp and cover said means for detachably and adjustably holding said mounting to capture and remove a small portion of the liquid refrigerant so that the cooled state of the cutting is maintained during removal thereof from the specimen.

2. An assembly for maintaining the integrity of a specimen cut while submerged in a body of liquid refrigerant, said assembly comprising in combination:
a plate for supporting the specimen,
and a gripper tool for grasping said plate while submerged in the liquid refrigerant, said gripper tool including jaw means for releasably gripping said plate, a handle for manipulating said jaw means, and a cover carried by said handle engaging said plate to entrap and retain a quantity of the liquid refrigerant within the chamber fromed between said plate and said cover and within which the specimen resides.

3. The assembly as defined in claim 2 wherein said cover is resiliently carried by said handle whereby said cover is maintained in bearing engagement with said plate when the latter is gripped by said jaw means.

4. The assembly as defined in claim 3 wherein said plate is dished and said cover is of inverted cup form.

References Cited

UNITED STATES PATENTS

| 1,343,051 | 6/1920 | Gosline | 83—915.5 |
| 2,428,412 | 10/1947 | Dodkin | 62—373 X |
| 3,187,739 | 6/1965 | Du Fresne | 83—15 X |
| 3,361,019 | 1/1968 | Weiskopf | 83—915.5 X |

WILLIAM E. WAYNER, Primary Examiner

U.S. Cl. X.R.

62—64, 320; 83—915.5